United States Patent

Hayashi et al.

[11] Patent Number: 6,077,437
[45] Date of Patent: Jun. 20, 2000

[54] DEVICE AND METHOD FOR RECOVERING AND REUSING A POLISHING AGENT

[75] Inventors: Yoshihiro Hayashi; Yukishige Saito; Tsutomu Nakajima; Shin Sato; Yukihiro Furukawa, all of Tokyo, Japan

[73] Assignee: NEC Corporation, Japan

[21] Appl. No.: 08/950,394

[22] Filed: Oct. 14, 1997

[30] Foreign Application Priority Data

Oct. 18, 1996 [JP] Japan ..................................... 8-276643

[51] Int. Cl.$^7$ .................................................. B01D 61/00
[52] U.S. Cl. ........................... 210/651; 210/641; 210/650; 210/195.2; 210/636; 210/333.01; 210/149; 210/90; 134/10; 451/88
[58] Field of Search .................... 210/650, 651, 210/636, 149, 90, 641, 195.2, 333.01; 134/10; 451/45, 88

[56] References Cited

U.S. PATENT DOCUMENTS

| | | | |
|---|---|---|---|
| 5,066,402 | 11/1991 | Amselme et al. | 210/636 |
| 5,352,277 | 10/1994 | Sasaki | 106/6 |
| 5,647,989 | 7/1997 | Hayashi et al. | 210/641 |
| 5,664,990 | 9/1997 | Adams et al. | 451/60 |

FOREIGN PATENT DOCUMENTS 8115892  5/1996  Japan .

*Primary Examiner*—Ana Fortuna
*Attorney, Agent, or Firm*—Morrison Law Firm

[57] ABSTRACT

A polishing agent recovery and reuse method and device for the same removes large impurities by a filtration device, concentrates by an ultrafiltration device, and continuously recovers polishing agent. Polishing agent used in polishing a semiconductor board or a coating formed on top of a semiconductor board is collected in a pre-processing container after use. Large impurities are removed by a dual fine filtration device. The resulting filtrate is concentrated by an ultrafiltration device. The concentrated solution may then be mixed with filtrate from the dual fine filtration device to further concentrate the polishing agent. The concentration of the polishing agent in the concentrated solution, the pH, and the temperature of the solution are continuously monitored and controlled. The filtrate of the ultrafiltration device is further treated to remove impurities, resulting in pure or ultrapure water. The recovered polishing agent may be reused in further polishing steps.

25 Claims, 6 Drawing Sheets

Time (days)

Prior Art

DEVICE AND METHOD FOR RECOVERING AND REUSING A POLISHING AGENT

BACKGROUND OF THE INVENTION

The present invention relates to a method for recovering a polishing agent which has been used in chemical-mechanical polishing of a semiconductor board or of a coating formed on top of a semiconductor board. The present invention also relates to a device for recovering such a polishing agent.

The surface of a semiconductor board and the surface of a coating formed on top of a semiconductor board are required to be as flat and planar as possible. Production of semiconductor integrated circuits often employs a photoresist patterning step, which uses exposure light to create a circuit pattern. In order to create more detailed patterns, a light having a shorter wavelength must be used. As a result of the short wavelength light, the allowable range for the depth of focus of the exposure can become less than 1 $\mu$m. This short depth of focus in turn dictates that the exposure surface must be as flat as possible to accurately create the desired integrated circuit pattern.

However, in a semiconductor integrated circuit having multiple levels of wiring and three-dimensional wiring levels, the insulating surface between the wiring levels is usually not flat, due to the presence of the lower level wiring patterns. As a result, the exposed interlayer insulating film surface must also be flat. Even in a trench isolation configuration which completely planarizes the board surface by embedding an isolation oxide film in the board, the board and the embedding insulating film must be made as flat as possible.

In current semiconductor insulating films, Al, W, or Cu is applied by a reflow sputter method or a chemical vapor deposition method to form a metallic film on top of wire grooves. By chemical mechanical polishing of these metallic films, a flattened wiring having metal embedded in a wiring groove can be formed.

Chemical-mechanical polishing utilizes a polishing agent to planarize an insulating film or to planarize an embedded metallic thin film of Al, W, Cu, or the like. In this method, polishing is conducted with a slurry polishing agent interposed between a polishing member, such as a polishing pad or the like, and a semiconductor board. The semiconductor board itself or a coating, such as a silicon oxide film or a metal thin film or the like, may also be planarized by this method.

In chemical-mechanical polishing, fine silica particles are often used as the polishing agent, because silica particles exhibit good dispersion and uniformity in average particle diameter. Generally, fine silica particles are dispersed in a dispersion medium, such as water, and used as a silica suspension. The polishing agent is then generally discarded after a single use. Normally, 250–500 ml of polishing agent is used for chemical-mechanical polishing of a single board surface layer. However, as polishing costs have increased, the process costs of semiconductor production have also increased. A technique for retrieving and reusing used polishing agent has therefore become desirable as a means to lower semiconductor production costs.

When polishing with such a polishing agent, all of the following become mixed in with the polishing agent and are discharged as polishing waste water: the polishing debris chipped off from the polishing pad or chipped off from the thin film material which forms the semiconductor board surface coating layer (such as silicon oxide film); the extra fine particles, which are the destroyed silica particles of the polishing agent; and the large diameter polishing debris, which are aggregates of thin film material pieces and polishing particles.

Generally in a chemical-mechanical polishing process applied to an insulating layer, a pad conditioning step is performed prior to polishing. In this pad conditioning step, the top surface layer of the polishing pad is ground using a rotating file bearing an electrocoating of fine diamond particles. In this pad conditioning step or in a later pad washing step, distilled water is mixed with the polishing waste water. The polishing agent within the polishing waste water therefore usually becomes quite dilute. If polishing waste water is reused as a polishing agent without any processing, the following problems arise:

1) The large diameter particles in the polishing waste water, including the polishing debris and aggregates, can cause scratches in the board surface. Furthermore, the polishing strength may be reduced by the build-up of polishing debris.

2) The extra fine particles, which are generated from the breakdown of polishing particles, can result in board contamination. In particular, the adhesive strength between the board and the polishing agent particles relates to the surface tension. If the polishing agent particles becomes extremely fine, the surface area per unit of volume increases. The surface tension of the particles rises, and the extra fine particles adhere strongly to the board. As a result, these extremely fine particles cannot be removed from the board surface layer by washing, leading to board contamination.

3) When the polishing agent concentration becomes low, the polishing speed of the silicon board surface coating (silicon oxide film in this case) decreases undesirably.

Referring to FIG. 6, a schematic flow diagram of the polishing agent recovery method of the prior art as described in Japanese Laid-Open Patent Application 8-115892 is shown. A fine filtration device 101 is divided by a fine filtration membrane 101a into a concentrated solution compartment 101b and a filtrate compartment 101c. Similarly, an ultrafiltration device 102 is divided by an ultrafiltration membrane 102a into a concentrated solution compartment 102b and a filtrate compartment 102c. Fine filtration membrane 101a has a pore size around 500 nm, and ultrafiltration membrane 102a has a pore size around 10 nm.

The colloidal silica, which are the extra fine polishing agent particles, is recovered from the polishing solution as follows. A used polishing solution 105 is brought to a pre-processing solution container 103. Pressure is applied by a pump P1, and the solution is supplied to concentrated solution compartment 101b of fine filtration device 101. Fine filtration is conducted across fine filtration membrane 101a. Particles of colloidal silica and fine impurities below 500 nm in diameter, as well as the dispersing medium, are transmitted into filtrate compartment 101c. The filtrate is passed to a mid-process solution container 104 as a mid-process solution 106. Any large impurities greater than 500 nm in diameter remain in concentrated solution compartment 101b. The concentrated large impurity solution passes through a valve 107 and circulates back to pre-processing solution container 103. This operation is repeated, and when the concentration factor becomes 30–50 times, the concentrated large impurity solution is discharged as waste water 113a from a valve 108 to a waste water pathway 109.

Mid-process solution 106, which has had large impurities removed by the fine filtration step, is then supplied from mid-process solution container 104 to concentrated solution compartment 102b of ultrafiltration device 102 under pressure from a pump P2. Ultrafiltration is conducted across ultrafiltration membrane 102a. Any fine impurities less than 10 nm in diameter, as well as the dispersion medium, are transmitted to filtrate compartment 102c. The filtrate is discharged as waste water 113b to a waste water pathway 110. Colloidal silica particles having a diameter of 10–500 nm remain in the concentrated solution side. The concentrated solution recirculates to mid-process solution container 104 via a valve 111. This operation is repeated, and when the concentrated solution reaches a specified concentration (10–30% by weight), the concentrated solution containing the colloidal silica is recovered as a recovery solution 114 through a valve 112.

Referring to FIG. 7, an example which applies the recovery method of FIG. 6 for planarizing polishing of an interlayer insulation film is shown. A polishing element 115 has a polishing pad 115c on a rotating platform 115b which rotates inside a casing 115a. Polishing is conducted on a silicon board 116 held by a rotating board chuck 115d. Silicon board is polished by pushing silicon board 116 against polishing pad 115c while a polishing agent 117 and a pad washing solution 118 (water) are dripped onto polishing pad 115c. The irregularities on the surface of the silicon oxide interlayer insulation film (not shown) formed on the surface of silicon board 116 are thereby removed. The polishing of the silicon oxide interlayer insulation film proceeds by the chemical etching action of the silicon oxide and the mechanical friction of the polishing agent particles.

A used polishing solution 105 is discharged from polishing element 115. Processing debris from the interlayer insulation film, as well as silica particles and ammonium salts, are present in used polishing solution 105. In recovery preparation portion 120, recovery solution 114 is generated from used polishing solution 105 by recovery/concentrating part 121, as described in FIG. 6. Waste water 113, which includes processing debris and water, is discharged.

Recovery solution 114 is sampled from a primary sampling pipe 119a en route from a recovery solution pipe 119 to a solution mixing area 130. The silica density, pH, and ammonium salt concentrations are measured by a silica concentration measuring device 122, a pH meter 123, and a conductance meter 124, respectively. Each of the values is transmitted to a control device 125. To equilibrate the silica, density, pH value, and ammonium salt concentration of recovery solution 114 with a silica abrasion particle original solution 126, appropriate amounts of an ammonium salt solution 27 and distilled water 128 are added to recovery solution 114. The flow of recovery solution 114 inside recovery solution pipe 119 is adjusted using flow controllers 127a and 128a. All steps are automatically controlled by signals from control device 125.

Recovery solution 114 is then reused as a reusing solution 114a. Reusing solution 114a is also sampled by a secondary sampling pipe 119b. The silica concentration, pH, and conductance (ammonium salt concentration) of reusing solution 114a are also monitored using silica concentration meter 122, pH meter 123, and conductance meter 124, respectively. Controlling device 125 then microadjusts the flow rates of ammonium salt solution 127 and distilled water 128 to obtain the appropriate values. The components of recovery solution 114 are thereby made identical to those of silica abrasion particle original solution 126.

Reusing solution 114a is next brought to a solution mixing area 130. The flow of silica abrasion particle original solution 126 is adjusted by flow controller 126a in response to control signals from control device 125. Reusing solution 114a and silica abrasion particle original solution 126 are mixed at a predetermined ratio to form polishing agent 117. Polishing agent 117 is dripped onto polishing pad 115c on top of rotating platform 115b. The flow of polishing agent 117 can be adjusted by a flow adjuster 117a.

Though adequate recovery and reuse of polishing agent is possible with this prior art method, the following problems are inherent in this procedure.

First, fine filtration membrane 101a has a pore size intermediate between the particle size of the large impurities, which are to be removed, and the particle size of the polishing agent, which is to be recovered. When fine filtration membrane 101a is used to concentrate and remove polishing debris, blinding of fine filtration membrane 101a occurs rapidly. Frequent washing or replacement of fine filtration membrane 101a becomes necessary. Theoretically, using a fine filtration membrane with a pore size intermediate between the particle diameter of the polishing agent and polishing debris should separate the two, but when using this kind of fine filtration membrane, there is intense blinding. As a result, a cake layer forms on the membrane surface, and relatively small sized colloidal silica particles become trapped. Further blinding is generated, and the pressure difference across the membrane rises.

Second, there is no concentration sensor for the recovered solution in mid-process solution container 106. When the diluted polishing waste water is concentrated using the ultrafiltration membrane, the concentration of the polishing agent cannot be continuously measured. Therefore, it is not possible to control this concentration step automatically.

Third, there is no back-washing feature to control the blinding of fine filtration membrane 101a.

Fourth, there is only one system of fine filtration device 101. When changing blinded fine filtration membrane 101a, it becomes necessary to shut down the entire polishing agent recovery device.

Fifth, when circulating mid-process solution through ultrafiltration membrane 102a, pump P2 not only circulates the solution, but also increases the solution temperature. The rate of polishing increases with increased polishing solution temperature. As a result, increased polishing solution temperature lowers the stability and predictability of the chemical-mechanical polishing.

Sixth, there is no feature for periodically backwashing ultrafiltration membrane 102a of ultrafiltration device 102.

Seventh, only the polishing agent particles are recovered from the polishing waste water from the chemical mechanical polishing device. Water, one of the major components, is discharged. Therefore, this system does not completely recover the used polishing solution.

FIG. 7, in the prior art method shown in FIG. 7, there is no means for adjusting the pH of the recovered solution in recovery/concentration portion 121. As a result, the polishing agent particles aggregate within the pipes where recovery solution 114 is transported, further decreasing flow through the system.

OBJECT AND SUMMARY OF THE INVENTION

Accordingly, it is an object of the present invention to provide a polishing agent recovery and reuse method and device that overcome the limitations of the prior art.

It is another object of the present invention to provide a polishing agent recovery and reuse method where large impurities, such as polishing debris or the like, are removed without rapid blinding and where water and polishing agent can be continuously recovered and reused.

A further object of the present invention is to provide a polishing agent recovery and reuse device which generates polishing agent from the polishing waste water and which automatically supplies the chemical mechanical polishing device with the recovered solution.

A further object of the present invention is to lower the amount of polishing solution required.

A further object of the present invention is to lower the cost of the planarizing polishing process.

A still further object of the present invention is to reduce the environmental burden of the planarizing polishing process.

Briefly stated, a polishing agent recovery and reuse method and device for the same removes large impurities by a filtration device, concentrates by an ultrafiltration device, and continuously recovers polishing agent. Polishing agent used in polishing a semiconductor board or a coating formed on top of a semiconductor board is collected in a pre-processing container after use. Large impurities are removed by a dual fine filtration device. The resulting filtrate is concentrated by an ultrafiltration device. The concentrated solution may then be mixed with filtrate from the dual fine filtration device to further concentrate the polishing agent. The concentration of the polishing agent in the concentrated solution, the pH, and the temperature of the solution are continuously monitored and controlled. The filtrate of the ultrafiltration device is further treated to remove impurities, resulting in pure or ultrapure water. The recovered polishing agent may be reused in further polishing steps.

According to an embodiment of the present invention, a polishing agent recovery device comprises a means for removing large impurities, and a means for concentrating the polishing agent in a polishing agent solution.

According to another embodiment of the present invention, a polishing agent recovery device, comprises at least two pleat-type filtration elements, each filtration element having a pore size of about 25 to 100 μm, an ultrafiltration device, the ultrafiltration device having an ultrafiltration membrane with a pore size of about 2 to 100 nm, a pH meter, effective to monitor a pH of a concentrated solution of recovered polishing agent, a thermometer, effective to measure a temperature of the concentrated solution, a cooling water circulating device, effective to maintain a temperature of the concentrated solution, a hydrometer, effective to measure a specific gravity of the concentrated solution, a high-pressure gas system, effective to backwash the ultrafiltration device, and a pure water producing device, effective to purify a filtrate from the ultrafiltration device.

According to another embodiment of the present invention, a method for recovering polishing agent comprises the steps of filtering used polishing agent through at least one of at least two microfilters, producing a first filtrate, and passing the first filtrate through an ultrafiltration device, producing a concentrated polishing agent solution and a second filtrate.

According to another embodiment of the present invention, a method for recovering polishing agent comprises the steps of filtering used polishing agent through at least one of at least two microfilters, producing a first filtrate, passing the first filtrate through an ultrafiltration device, producing a concentrated polishing agent solution and a second filtrate, mixing the concentrated polishing agent solution with the first filtrate and recirculating the mixed polishing agent solution through the ultrafiltration device, monitoring a pH of the concentrated polishing solution and maintaining the pH at a predetermined value, monitoring a concentration of the polishing agent in the concentrated polishing agent solution, monitoring a temperature of the concentrated polishing agent solution and controlling the temperature, recovering a dispersion medium of the polishing agent from the second filtrate, and monitoring an increase in blinding of a membrane of said ultrafiltration device.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
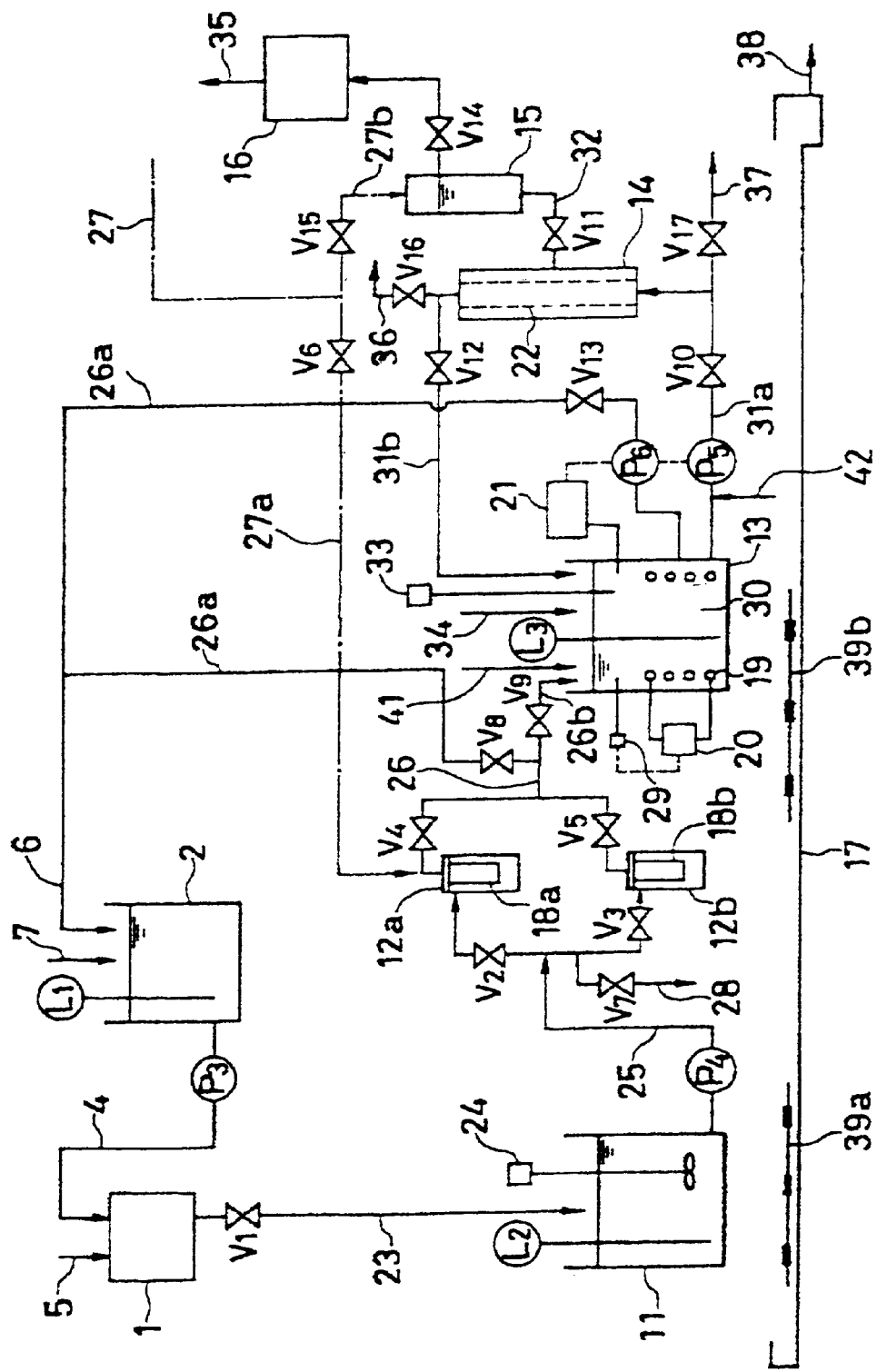
FIG. 1 is a schematic flow diagram showing the polishing agent recovery method of the present invention.

In the present invention, filtration is conducted using a fine filtration device having pore sizes greater than the diameters of the largest impurities of polishing debris and the like. The pore sizes for the fine filtration device are about 25–100 μm, and ideally about 50–75 μm.

The fine filtration device of the present invention is also called a microfilter. Filtration membranes (MF membranes) made from polycarbonate, triacetate cellulose, polyamide (nylon), polyvinyl chloride, polyvinylene fluoride or the like can be used. Wind-type or pleat-type filtration elements may be used. However, it is preferable to use a filtration device with a wind-type filtration element comprising monofilament of a plastic such as polypropylene or the like. It is further preferable that the pore size of the monofilament be about 25–100 μm. The filtration membrane is preferably supported by a porous backing, and when using a wind type filtration element, the filtration element is preferably supported by a supporting board.

Fine filtration is conducted by filtering used polishing waste water at a pressure of 0.1–5 kgf/cm$^2$ G(0.01–0.5 MPa). Large impurities which lead to scratches during polishing are removed. The large impurities can include large diameter polishing debris, aggregates, gelled substances, and the like. Aggregation of the large impurities creates a caking layer. Impurities with diameters smaller than the filtration material pores are eliminated, and blinding of the fine filtration membrane is prevented.

A concentrating process is conducted by continuously circulating the post-filtration polishing waste water (the filtrate) to an ultrafiltration device which uses an ultrafiltration membrane (UF membrane) having a pore size of about 2–100 nm. The currently known range of ultrafiltration membranes includes the following materials: collodian membrane, hardened formaldehyde gelatin, cellophane, cellulose, cellulose acetate, polyethylene, polypropylene, acetyl cellulose, a mixture of polypropylene and acetyl cellulose, polyacrylonitrile, polysulfone, sulfonated 2,5 dimethylpolyphenylene oxide, polyion complex, polyvinyl alcohol, polyvinyl chloride, and the like. The membrane separates out atomic aggregates of molecular weight about $10^3$–$10^9$, such as molecular colloids, micelle colloids, synodical colloids, viruses, or the like. No further restrictions on the membrane material are required.

The ultrafiltration membrane is supported by a porous backing. Ultrafiltration is conducted by supplying post-fine filtration polishing agent at a pressure of about 1–5 kg/cm$^2$G (0.01–0.5 MPa). In the present invention, the pore size is preferably about 2–100 nm, more preferably about 2–30 $\mu$m. When using a commercially available product, in particular an ultrafiltration membrane of molecular weight separation of around 300,000, dispersing medium such as water and the like containing minute impurities such as fine polishing debris is removed by passing through the filter. The polishing agent, which is mainly inorganic oxide particles having a diameter of about 10–500 nm is concentrated and recovered.

In the present invention, concentration is performed by repeatedly passing a concentrated solution of polishing agent through an ultrafiltration membrane. When the polishing agent in the concentrated solution reaches a desired concentration, the solution is returned to the polishing step. It is preferable to monitor the concentration by a specific gravity meter, although the concentration may be monitored by any other appropriate means, such as a light dispersion method. Preferably, a pycnometer, which is a weight enclosed in a glass tube, is placed in a measuring cell. The height of this hydrometer is detected by a short distance analog sensor. The specific gravity is thereby measured, and by converting the specific gravity to a concentration, the concentration of the polishing agent in the concentrated solution may be determined.

Concentration by repeated passage across the ultrafiltration membrane is conducted by circulating the concentrated solution with a pump. However, due to heat generation by the pump, the temperature of the concentrated solution rises over time. It is therefore preferable to have a means to maintain the concentrated solution at a constant temperature. To accomplish this, a cooling water pipe preferably is placed on the concentrated solution container and cooling water circulated.

The item to be polished is typically a semiconductor board or a board coating layer. The semiconductor board or the board coating layer to be polished may include one or more of the following: multi-level wiring interlevel insulation film, embedded oxide films for trench isolation, and/or metal films for planar embedded wiring. For chemical-mechanical polishing of such semiconductor boards, a polishing agent, comprising inorganic oxide particles or particle aggregates of several particles, is dispersed in a liquid and interposed between a polishing member, such as a pad or the like, and a semiconductor board. Other polishing methods are also considered to be within the scope of the present description, including polishing while circulating a polishing agent adjusted to a desired concentration.

The polishing agent of the present invention is not limited to any particular agent. The polishing agent may include inorganic oxide particles, such as silica, alumina, cerium oxide, or the like. The polishing agent may also include aggregates of these particles. The polishing agent may rise mainly liquid phase growth or vapor phase growth silica particles having a diameter of about 30–300 nm. After polishing, the waste water includes large diameter polishing debris having a diameter of about 700–1500 nm, as well as the above polishing agent and aggregates. This large diameter polishing debris is removed by fine filtration.

The polishing waste water may include one or more of the following: a polishing agent, polishing debris, and distilled water. The waste water may be a used polishing agent which has its polishing strength greatly reduced, or it may be a polishing agent which is in the midst of polishing and which still has some polishing strength. This liquid containing the polishing agent need only contain inorganic oxide particles, such as colloidal silica or the like. Additional components other than inorganic oxide particles that will not interfere with polishing may also be included.

The recovered polishing agent may be used as polishing agent directly by circulating the polishing agent back to the polishing step. Alternatively, the recovered polishing agent can be used as a raw material for preparation of new polishing agent. Furthermore, the filtrate from the ultrafiltration can be supplied to a distilled water-producing device. Purified water or ultrapurified water can be recovered by semipermeable membrane separation, ion exchange, or the like. The recovered water may then be used as a washing solution in the polishing step.

When using silica particles or cerium oxide as a polishing agent, the silica particles can be used without modification. Alternatively, alkaline agents, such as potassium hydroxide or ammonium hydroxide, can be added. Such alkaline agents are transmitted to the filtrate side during the ultrafiltration step and thereby removed. It is therefore preferable to detect the pH in the concentrated solution container and add a the alkaline agent to the concentrated solution. The solution can be then returned to the polishing process. The alkaline agent transferred to the filtrate may be recovered by any appropriate means, such as ion exchange or the like, and be reused.

When using alumina particles as a polishing agent, it is well-known to add acidic agents, agents such as nitric acid, phosphoric acid, or the like, to the polishing solution. These acid agents may similarly be transmitted to the filtrate side during ultrafiltration and removed. Because of this, it is preferable to control the pH of the recovered polishing agent solution by monitoring the pH of the concentrated solution container, and adding an acid agent as required. The solution is then sent to the polishing step.

Referring to FIG. 1, the present invention includes a polishing device 1. Prior to polishing, a rotating diamond electrocoated board not shown) is pressed against a polishing pad (not shown). During the polishing pad conditioning step, washing fluid 5, which is preferably ultrapure water, is introduced. Washing fluid 5 is also supplied when the polishing pad is washed. After this conditioning step, polishing agent 4 is transported from a polishing agent container 2 by a pump P3. Polishing agent 4 is interposed between a board and a polishing pad (not shown), and polishing takes place. During polishing, a polishing waste water 23 is produced.

Polishing waste water 23 discharged from polishing device 1 via a valve V1 is brought to a pre-processing solution container 11. Normally, in chemical-mechanical polishing of an oxide film, a polishing solution with dispersed silica particles is used at a concentration of about 20 wt %, but because polishing pad washing fluid 5 is mixed into waste water 23, the silica particle concentration becomes diluted to 1–10%. Polishing waste water 23 is agitated by an agitator 24, and settling of polishing agent, impurities and the like is prevented. The level of polishing waste water 23 in pre-processing solution container 11 is monitored by a water surface meter L2. A pre-processing solution 25 is brought to fine filtration devices 12a and 12b by a pump P4 via valves V2 and V3. Pre-processing solution 25 is filtered by fine filtration devices 12a and 12b, and large-diameter particulate impurities are removed. A filtrate 26 is removed through valves V4 and V5.

Fine filtration devices 12a and 12b are preferably configured with wind-type filtration elements 18a and 18b. Wind-type filtration units 18a and 18b include a wound polypropylene monofilament having an opening of about 25–100 $\mu$m.

Because fine filtration devices 12a and 12b are identical and independent, both can be operated simultaneously, or one can be operated while the other is being washed. Washing of the filtration elements 18a or 18b (backwashing) is conducted by bringing in high pressure gas ($N_2$ gas or air or the like) from washing gas introduction pathways 27 and 27a via a valve V6. A washing waste water 28 which includes the dislodged cake is discharged via a valve V7. Washing is conducted automatically by monitoring the rise in pressure difference across filtration elements 18a and 18b.

Filtrate 26 is brought to concentrated solution container 13 from transfer path 26b via a valve V9, and added to a concentrated solution 30. The level of concentrated solution 30 in concentrated solution container 13 is detected by a liquid-level meter L3. When the level of concentrated solution 30 reaches a desired value, a pump P5 and a valve V10 are operated to allow concentrated solution 30 to flow into ultrafiltration device 14.

Generally, polishing speed increases with an increase in the temperature of the polishing solution. Accordingly, to maintain control over the chemical-mechanical polishing process, maintenance of the polishing solution temperature is important. Normally, it is desirable to maintain polishing solution temperature at about 20–25° C. In the present invention, temperature of concentrated solution 30 is detected by a thermometer 29. Concentrated solution container 13 has a cooling water pipe 19 and a concentration monitor 21. The amount of cooling water which circulates from a cooling water circulating device 20 to cooling water pipe 19 is controlled in order to maintain the temperature of concentrated solution 30 at a constant value.

The concentration of polishing agent in concentrated solution 30 in concentrated solution container 13 is monitored by concentration monito 21. Concentrated solution is brought into the measuring cell, and a hydrometer is placed inside. The level of the concentrated solution is measured by a short distance analog sensor. The specific gravity is measured, and the polishing agent concentration is calculated from the specific gravity of the concentrated solution. The circulation of concentrated solution 30 to ultrafiltration device 14 is conducted until the concentration measurement value reaches a predetermined value.

In the early stages of polishing, polishing waste water 23 contains used polishing agent 4 at a high concentration. Concentration of used polishing agent 4 may not be required. When concentration is not necessary, filtrate 26 is recovered to polishing agent container 2 as recovered polishing agent 6 from recovery path 26a via a valve V8.

Concentrated solution 30 in concentrated solution container 13 is transferred to an ultrafiltration device 14 from circulating path 31a via a valve V10. Concentration is conducted by membrane separation through a UF membrane 22. UF membrane 22 is preferably of a tubular shape, but it may alternatively be a flat membrane, hollow string type membrane, or a spiral type membrane. Concentrated solution 30 which has passed through ultrafiltration device 14 recirculates to concentrated solution container 13 from circulation path 31b via a valve V12 until the concentration measurement value reaches a predetermined value. When the concentration measurement value reaches the desired value, the pH of concentrated solution 30 is measured by a pH meter 33. Alkaline agents, such as potassium hydroxide or ammonium hydroxide, or acids, such as nitric acid or phosphoric acid, are added by a chemical feeding tube 34 until the desired pH value is attained. Concentrated solution 30 is therefore treated to have the same composition as that of polishing agent 4. Although in this example, we describe monitoring of the chemical characteristic of concentrated solution 30 by measuring and adjusting the pH, it will also be appreciated by those in the art that it is possible to monitor other chemical characteristics in place of pH (such as ion concentration, conductance, or oxidation/reduction potential) by means well known in the art.

When concentrated solution 30 has attained the desired chemical characteristics, pump P5 is stopped and pump P6 is operated. Concentrated solution 30 is recovered into polishing agent container 2 as recovered polishing agent from recovery path 26a via a valve V13. The discharge of concentrated solution 30 is conducted until a minimum water level is detected by water level meter L3. Thereafter, filtrate from filtering devices 12a and 12b is brought into concentrated solution container 13 by opening valve V9 until a maximum water level is detected by water level meter L3. The solution is again circulated to ultrafiltration device 14, and the apparatus returns to the concentrating process.

Filtrate 32, which includes low electrolytic ions such as bases and the like, fine polishing debris, and water which passes through UF membrane 22, is taken to a filtrate container 15 via a valve V11. Filtrate 32 is then sent to pure water producing device 16 via a valve V14. Pure water producing device 16 removes impurities from filtrate 32 by any appropriate means, such as a semipermeable membrane device, an ion exchange device, or the like. The resulting water is recovered water 35 and is reused as washing water 5 or any other desired purpose.

Polishing agent having a low concentration (1–5 wt %) from the early steps to high concentration (20 wt %) in the final step passes through ultrafiltration device 14. As the polishing solution concentration increases, the load for blinding of UF membrane 22 also increases. When UF membrane 22 becomes blinded (or whenever otherwise desired), a high pressure gas for washing is brought in via a valve V15 from washing gas introduction paths 27 and 27b, and UF membrane 22 is backwashed. The washing waste gas is discharged from discharge path 36 via a valve V16. Discharge waste water 37 is discharged via a valve V17.

The device of the present invention may be placed on top of a drain pan 17 within a clean room. Leakage water from every part is collected in drain pan 17 and is discharged out as waste water 38. Leakage water sensors 39a and 39b are placed in drain 17. When leakage water is detected, the device can be halted so that the leak may be investigated. A washing fluid path 41 and 42 communicates with concentrated solution container 13 and a pump P5. From here, washing fluid such as ultra pure water, $N_2$ gas or the like is introduced. When there is a long shutdown period or during device transfer time, cleaning of part of or the entire circuit, which includes concentrated solution container 13 and pump P5, may be conducted. The waste water is discharged from discharge pathway 37 through a valve V17.

For pumps P3–P6, any pump such as a gear pump, a bellows pump, or the like may be used. When using a gear pump, it is preferable to connect the device exhaust to an organic exhaust duct.

By using the method and device of the present invention, polishing agent 4 used in chemical-mechanical polishing device 1 is circulated and reused. In the present invention, there is no limit to the number of circulation cycles. As the number of circulation cycles increases, the amount of polishing agent required for planarizing polishing of the board coating is reduced, and the production cost is reduced. However, if the number of circulation cycles becomes too great, the polishing speed may be lowered or polishing scratches can result. Normally, the number of circulation cycles is around 2–5. After finishing a set number of polishing agent circulations, the polishing waste water is discharged from pre-processing solution container 11 via valve V7. All of polishing waste water 23 may be discharged, or only a portion may be discharged. A supplemental polishing agent 7 may be supplied which matches the amount discharged, and the solution may be circulated and reused.

If the processing volume of the filtration device and the ultrafiltration device is increased, the polishing agent from polishing waste water of a plurality of chemical-mechanical polishing devices can be recovered simultaneously, and each chemical-mechanical polishing device can be supplied with polishing solution as required.

First Experiment

Using the device in FIG. 1, polishing waste water which contained 0.1–1.3 weight % of fine silica particles was fine filtered and ultrafiltered, and a polishing agent recovery solution of 20 weight % was obtained. For filtering elements 18a and 18b, a wind type filter with openings of 0.5, 1, 5, 10, 25, 50, 75, 100, or 150 μm, or a pleats cartridge filter with openings of 1, 3, 10, or 30 μm were used. For UF membrane 22, a membrane with a molecular weight separation of 20,000 was used. The pH of the initial solution and the recovery solution were maintained at neutrality. Recovery solution was created with each filter. The results are shown in Table 1.

TABLE 1

Effect of filtration membrane type

| | Pore size (μm) | Recovery of polishing agent (%) | Presence of large particles (>700 nm) |
|---|---|---|---|
| Wind-type polypropylene | 0.5 | 1 | None |
| Wind-type polypropylene | 1 | 5 | None |
| Wind-type polypropylene | 5 | 8 | None |

TABLE 1-continued

Effect of filtration membrane type

| | Pore size (μm) | Recovery of polishing agent (%) | Presence of large particles (>700 nm) |
|---|---|---|---|
| Wind-type polypropylene | 10 | 15 | None |
| Wind-type polypropylene | 25 | 75 | None |
| Wind-type polypropylene | 50 | 85 | None |
| Wind-type polypropylene | 75 | 95 | None |
| Wind-type polypropylene | 100 | 95 | None |
| Wind-type polypropylene | 150 | 95 | Yes |
| Pleat-type polypropylene | 1 | 0.5 | None |
| Pleat-type polypropylene | 3 | 1 | None |
| Pleat-type polypropylene | 10 | 5 | None |
| Pleat-type polypropylene | 30 | 50 | None |

From the above, it is evident that a filter size of about 25–100 μm is preferred. With a filter size below 10 μm, recovery of the used polishing agent was undesirably low. It can also be seen that, for a given pore size, recovery rates are higher with a wind type filter than a pleats type filter.

Second Experiment

The stability of ultrafiltration membrane 22 was tested. A commercial ultrafiltration membrane (Kurare KL-U-6303, membrane area 0.14 $m^2$) and a commercial polishing agent (Fujimi, Planarite 4101) were used. To test the stability of ultrafiltration membrane 22, the polishing agent original solution was continuously circulated for 8 days, and the stability of the pressure and filtration volume, the polishing agent concentration, and particle size distribution were determined. Referring to FIG. 1, the washing gas was brought from washing gas introduction pathways 27 and 27b via valve V15. UF membrane 22 was backwashed for three seconds every 10 minutes. The pH of the initial solution and the recovery solution were maintained at neutrality.

Figure 2A:
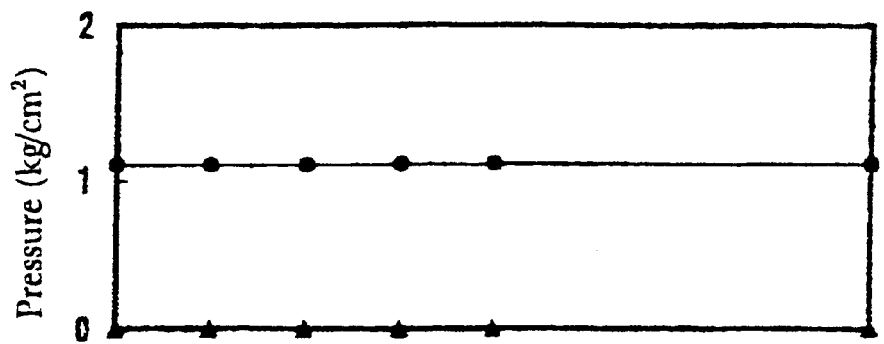
FIG. 2(a) shows the pressure changes over time in the ultrafiltration device of the present invention.
Figure 2B:
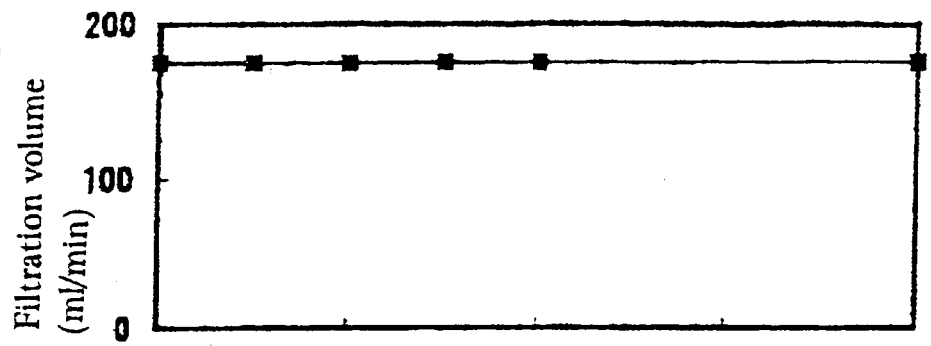
FIG. 2(b) shows the changes in filtrate amount over time in the ultrafiltration device of the present invention.
Figure 2C:
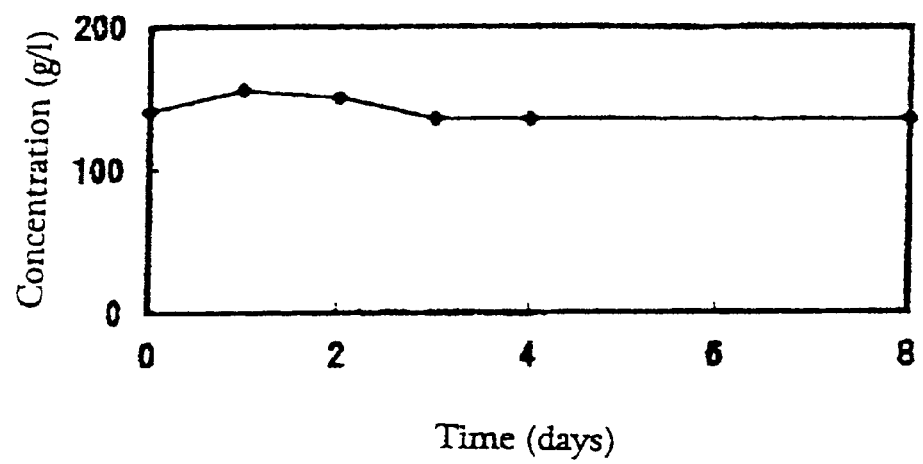
FIG. 2(c) shows the changes in polishing agent concentration over time in the ultrafiltration device of the present invention.
Figure 3A:
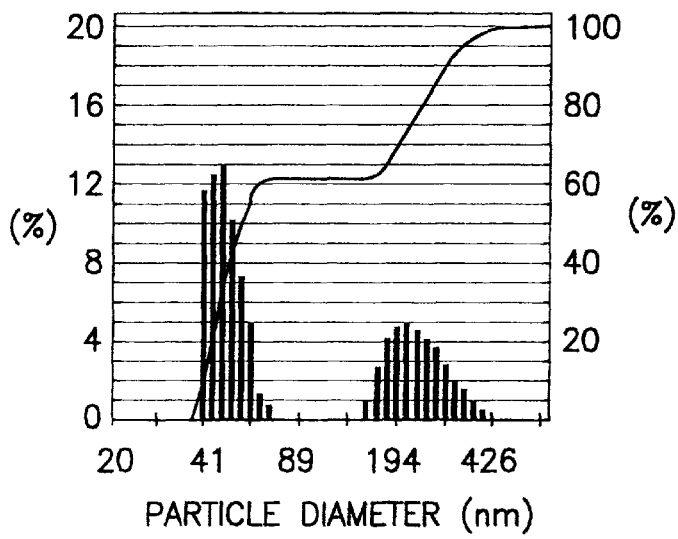
FIG. 3(a) shows the particle size distribution at the start of circulation in the present invention.
Figure 3B:
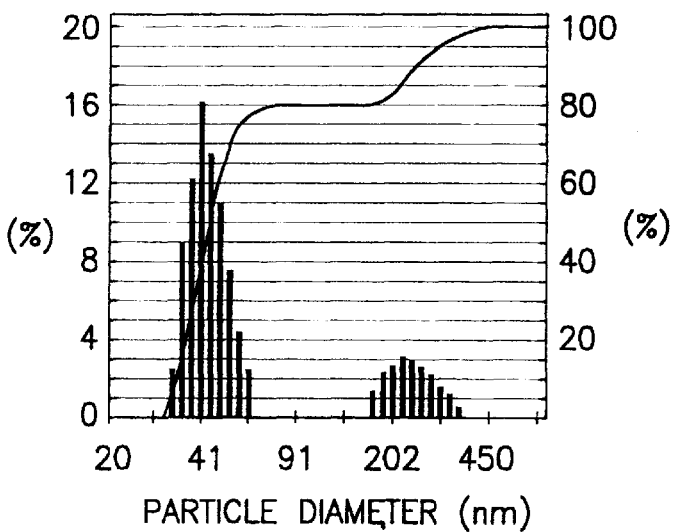
FIG. 3(b) shows the particle size distribution at day 8 of operation of the present invention.

Referring to FIGS. 2(a), 2(b), and 2(c), respectively, during the 8 days of continuous operation, there was no change in the ultrafiltration membrane entrance pressure (1.0 kg/$cm^2$), membrane exit pressure (0 kg/$cm^2$), filtration rate (175 ml/min), or polishing agent concentration (14 wt %). In addition, no difference was observed between the particle size distribution of the polishing agent at the beginning of circulation (FIG. 3(a)) and the particle size distribution after 8 days of operation (FIG. 3(b)). Similar experimental results were obtained with different ultrafiltration membrane areas.

From the above results, the continuous automatic operation stability of the concentrating function of the present invention is confirmed.

Third Experiment

The characteristics of the polishing agent recovery solution obtained from the filtration/concentration process of the recovery device of FIG. 1 were evaluated. The polishing agent original solution (Fujimi, Planarite 4101) used for the planarizing polishing of the oxide film was supplied to a polishing pad (Rodale, IC1000/SUBA 400) at 50 ml/min. The silicon oxide film was polished with a polishing pad rotating at 35 rpm, a board holding head rotating at 35 rpm, at a polishing pressure of 0.4 kg/$cm^2$. The polishing agent original solution concentration was 20 wt %. The polishing waste water was diluted to 1.7 wt %. The polishing agent recovery solution (concentration 22 wt %) was obtained from polishing waste water by the filtration/concentration process, using the device shown in FIG. 1. The particle size distribution of the polishing agent solution and the polishing agent recovery solution were measured by a laser dispersion method.

Figure 4:
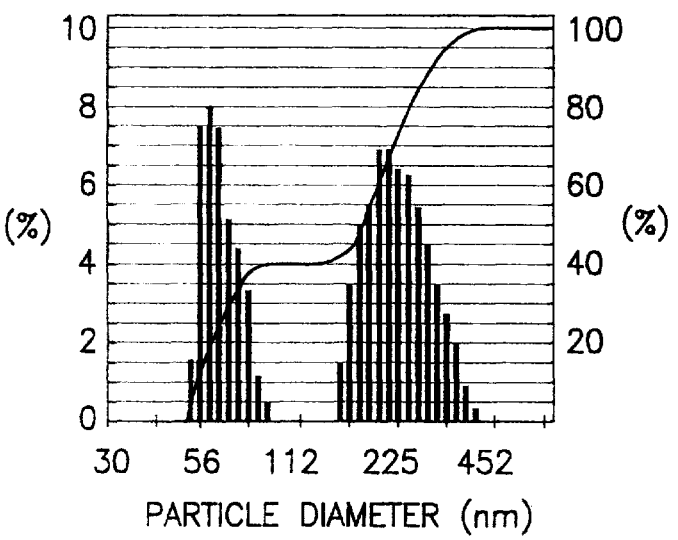
FIG. 4 is a diagram shows the particle size distribution of the polishing agent recovery solution of the present invention.

Referring to FIG. 4, the polishing agent recovery solution has approximately the same particle size distribution as the original polishing agent solution (FIG. 3). The particle size distribution of the polishing agent recovery solution is composed of silica particles with an average particle diameter of around 60 nm to silica particle aggregates with an average diameter size of around 220 nm. However, there was some variability over time in the relative percentages of particle with given diameters (compare FIG. 4 with FIG. 3).

Figure 5:
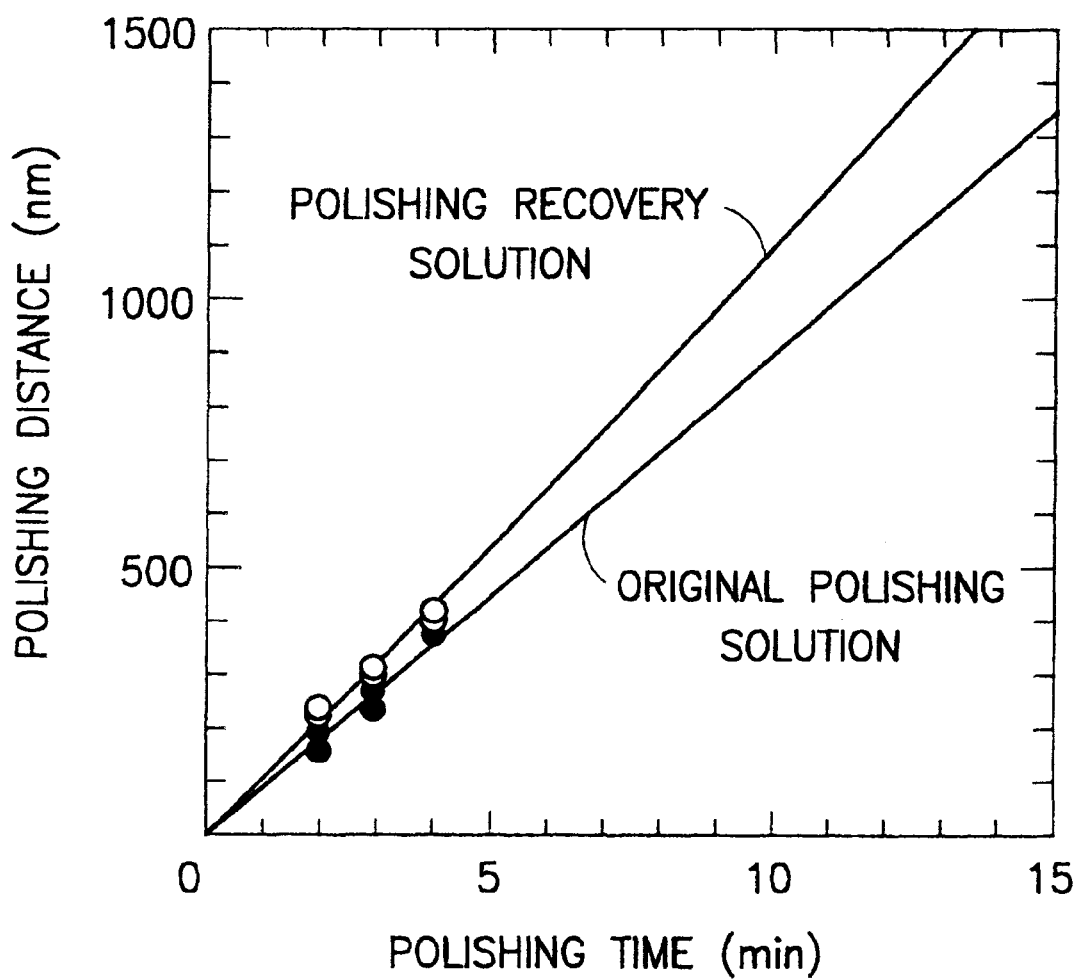
FIG. 5 is a diagram which demonstrates the oxide film polishing speed of the present invention.
Figure 6:
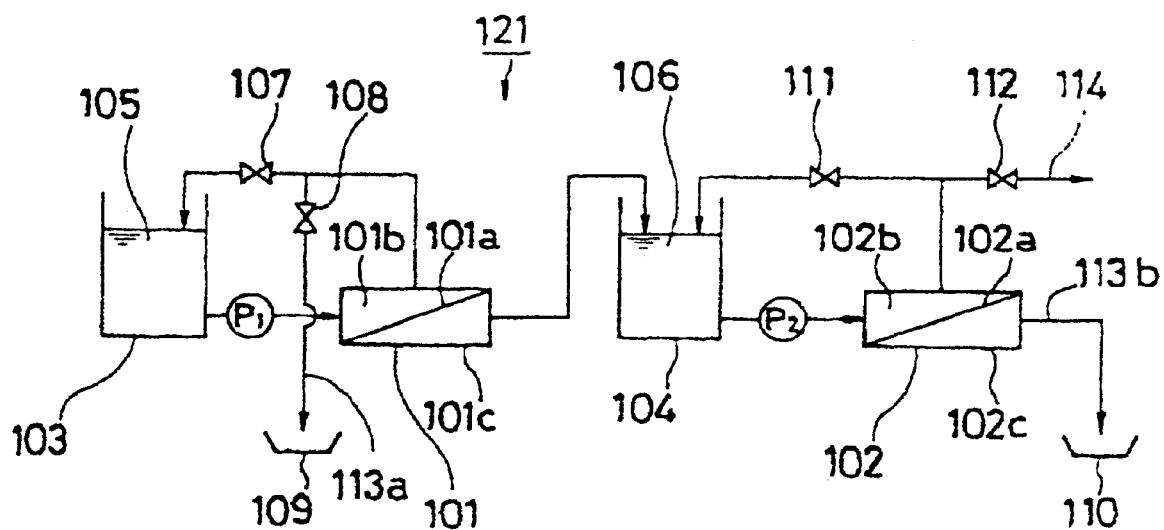
FIG. 6 is a schematic flow diagram which shows a prior art recovery method.
Figure 7:
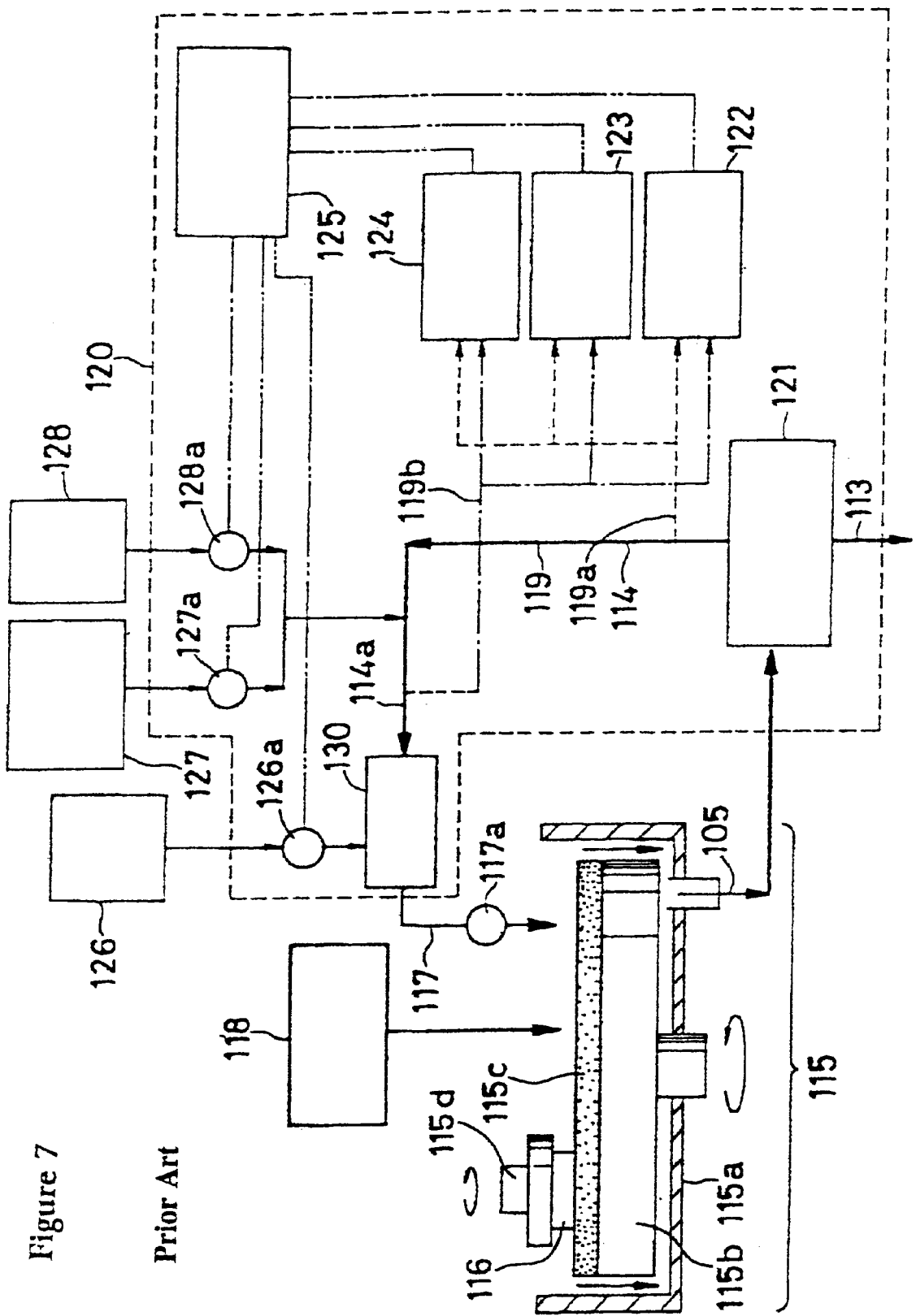
FIG. 7 is a schematic flow diagram showing the application of the prior art recovery method to the planarizing polishing of an interlayer insulating film.

Referring to FIG. 5, the oxide film polishing speed using the original polishing agent solution was compared to the polishing speed using the polishing agent recovery solution. The original polishing agent solution or the polishing agent recovery solution was supplied to a polishing pad (Rodale Company: IC1000/SUB400) at 50 ml/min. The silicon oxide film is polished as described above. The polishing speed was 97 nm/min when using the original polishing agent solution at a polishing pressure of 0.4 kg/cm$^2$. When using a polishing agent recovery solution, the polishing speed was 110 nm/min, which is very similar to that obtained when the original polishing agent solution.

The oxide film surface of the scrub washed board surface was measured after polishing, using a laser particle detector (Surface Scan 6200), to detect remaining particles and scratches. When either original polishing agent solution or polishing agent recovery solution were used, the number of remaining particles greater than 0.2 micrometers was less than 200 per 6 inches of board. In neither case were scratches observed by the laser particle detecting device.

No differences from the polishing original solution could be observed in the silica particle size distribution in the polishing agent recovery solution, in its polishing function, or in the removability of the polishing agent particles after polishing. Furthermore, using the device shown in FIG. 1, the polishing agent recovery solution was recovered and reused up to 5 times, but no changes were observed in the polishing function and in the removability of the polishing agent particles after polishing. After the number of recovery and reuse surpassed 10 times, a reduction in polishing speed could be observed.

Fourth Experiment

In the experiments described above, a neutral silica polishing agent was used. A silica polishing original solution having a pH of 11 was evaluated in a similar manner as the third experiment. The pH of the polishing waste water was reduced to around 9 prior to the fine filtration step. Using the device in FIG. 1, when the polishing waste water was fine filtered and ultrafiltered, the pH in concentrated solution 30 remained around 9. Potassium hydroxide of around pH 13 was added to the concentrated solution by chemical feeding tube 34 to return the pH to 11. When using this polishing agent recovery solution, the polishing speed of the oxide film was around 200 nm/min. Comparisons with the original silica polishing solution showed no differences between the original polishing agent solution and the polishing agent recovery solution.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A polishing agent recovery device, comprising:
    a means for removing large impurities to form a filtrate;
    said means for removing including at least one microfilter having a pore size of about 25 to 100 μm; and
    a means for concentrating said polishing agent to a polishing agent solution;
    said means for concentrating further including means for recirculating a retentate through said means for concentrating.

2. A polishing agent recovery device according to claim 1, wherein said means for removing large impurities includes a wind filtration element having a pore size of about 25 to 100 μm.

3. A polishing agent recovery device according to claim 1, wherein said means for removing large impurities includes a pleat filtration element having a pore size of about 25 to 100 μm.

4. A polishing agent recovery device according to claim 1, wherein said means for concentrating is one of a flat membrane, a hollow string membrane, and a spiral membrane.

5. A polishing agent recovery device according to claim 1, wherein:
    said means for concentrating said polishing agent includes an ultrafiltration device, said ultrafiltration device having an ultrafiltration membrane with a pore size of about 2 to 100 nm.

6. A polishing agent recovery device according to claim 1, further comprising a means to monitor and control a concentration of said polishing agent in said polishing agent solution.

7. A polishing agent recovery device according to claim 6, wherein said means to monitor and control a concentration of polishing agent in said polishing agent solution includes a hydrometer.

8. A polishing agent recovery device according to claim 1, further comprising a means to monitor and control at least one of pH, conductance, and oxidation/reduction potential in said polishing agent solution.

9. A polishing agent recovery device according to claim 1, further comprising means to monitor an increase in blinding of a membrane of said means for concentrating.

10. A polishing agent recovery device according to claim 9, wherein said means to monitor an increase in blinding includes an apparatus to measure a pressure differential across said membrane.

11. A polishing agent recovery device according to claim 1, further comprising means to backwash a membrane of said means for concentrating.

12. A polishing agent recovery device according to claim 1, further comprising a means to monitor and control a temperature of said polishing agent solution.

13. A polishing agent recovery device according to claim 1, further comprising a means to recover a dispersion medium of said polishing agent solution.

14. A polishing agent recovery device according to claim 13, wherein said means to recover a dispersion medium includes at least one of a semipermeable membrane device and an ion exchange device.

15. A polishing agent recovery device, comprising:
    at least two pleat filtration elements, each filtration element having a pore size of about 25 to 100 μm;
    an ultrafiltration device, said ultrafiltration device having an ultrafiltration membrane with a pore size of about 2 to 100 nm;
    a pH meter, effective to monitor a pH of a concentrated solution of recovered polishing agent;
    a thermometer, effective to measure a temperature of said concentrated solution;
    a cooling water circulating device, effective to maintain a temperature of said concentrated solution;

a hydrometer, effective to measure a specific gravity of said concentrated solution;

a high-pressure gas system, effective to backwash said ultrafiltration device; and a pure water producing device, effective to purify a filtrate from said ultrafiltration device.

16. A method for recovering polishing agent, comprising the steps of:

filtering used polishing agent through at least one of at least two microfilters having a pore size of about 25 to 100 μm, producing a first filtrate; and repeatedly passing said first filtrate through an ultrafiltration device until a predetermined concentration of polishing agent solution and a second filtrate are obtained.

17. The method for recovering polishing agent of claim 16, further comprising mixing said concentrated polishing agent solution with said first filtrate and recirculating said mixed polishing agent solution through said ultrafiltration device.

18. The method for recovering polishing agent of claim 16, further comprising monitoring a pH of said concentrated polishing solution and maintaining said pH at a predetermined value.

19. The method for recovering polishing agent of claim 16, further comprising monitoring a concentration of said polishing agent in said concentrated polishing agent solution.

20. The method for recovering polishing agent of claim 16, further comprising monitoring a temperature of said concentrated polishing agent solution and controlling said temperature.

21. The method for recovering polishing agent of claim 16, further comprising recovering a dispersion medium of said polishing agent from said second filtrate.

22. The method for recovering polishing agent of claim 16, further comprising monitoring an increase in blinding of a membrane of said ultrafiltration device.

23. A method for recovering polishing agent, comprising the steps of:

filtering used polishing agent through at least one of at least two microfilters having a pore size of about 25–100 μm, producing a first filtrate;

passing said first filtrate through an ultrafiltration device, producing a concentrated polishing agent solution and a second filtrate;

repeatedly mixing said concentrated polishing agent solution with said first filtrate and recirculating said mixed polishing agent solution through said ultrafiltration device;

monitoring a pH of said concentrated polishing solution and maintaining said pH at a predetermined value;

monitoring a concentration of said polishing agent in said concentrated polishing agent solution;

monitoring a temperature of said concentrated polishing agent solution and controlling said temperature;

recovering a dispersion medium of said polishing agent from said second filtrate; and monitoring an increase in blinding of a membrane of said ultrafiltration device.

24. A method for recovering polishing agent, comprising the steps of:

filtering used polishing agent through at least one of at least two microfilters, producing a first filtrate;

recycling said first filtrate from said at least one of at least two microfilters to a recovered polishing agent container, when a concentration of said used polishing agent in said first filtrate is above a predetermined concentration;

feeding said first filtrate from said at least one of at least two microfilters to an ultrafiltration device when a concentration of said used polishing agent in said first filtrate is below a said concentration, producing a second filtrate and a retentate;

recycling said retentate between said ultrafiltration device and a concentrated solution container until said used polishing agent in said retentate of said ultrafiltration device is above a predetermined concentration; and recovering said retentate from said concentrated solution container for use as a polishing agent.

25. A method for recovering polishing agent, according to claim 24, wherein said at least one of at least two microfilters have a pore size of about 25 to 100 μm; and said ultrafiltration device has a filter having a pore size of about 2 to 100 nm.

* * * * *

UNITED STATES PATENT AND TRADEMARK OFFICE
CERTIFICATE OF CORRECTION

PATENT NO.    : 6,077,437
DATED         : June 20, 2000
INVENTOR(S)   : Yoshihiro Hayashi, Yukishige Saito, Tsutomu Nakajima, Shin Sato and Yukihiro Furukawa It is certified that error appears in the above-identified patent and that said Letters Patent is hereby corrected as shown below:

<u>Title page,</u>
Item [73], add: -- [73] Assignee: Kurita Water Industries, Ltd., Japan --

Signed and Sealed this

Fifteenth Day of October, 2002

*Attest:*

*Attesting Officer*

JAMES E. ROGAN
*Director of the United States Patent and Trademark Office*